Feb. 24, 1959 J. H. THORNBERY 2,874,905

CONTROL DEVICE

Filed Sept. 14, 1953 2 Sheets-Sheet 1

INVENTOR.
John H Thornbery
BY
Seegert & Schwalbach
Attys.

INVENTOR.

John H. Thornbery

BY

Seegert & Schwalbach

Attys.

United States Patent Office 2,874,905

Patented Feb. 24, 1959

2,874,905

CONTROL DEVICE

John H. Thornbery, Whitefish Bay, Wis., assignor to Baso Inc., Milwaukee, Wis., a corporation of Wisconsin Application September 14, 1953, Serial No. 380,079

4 Claims. (Cl. 236—9)

This invention relates to apparatus including electrical circuits powered from a thermoelectrically generated source or the like, and more specifically to control means imposed upon such apparatus but independent of the electrical circuits thereof for additional control functions and/or remote location of control instrumentalities.

The amount of resistance in an electrical circuit of low power, for example, a thermoelectric circuit, is critical because of the small amount of power involved. If too much resistance is present, thermoelectric current cannot flow through the circuit in sufficient quantity to accomplish the desired result, for example to energize a control device such as an electromagnetic valve operator. The resistance limitations dictate that all connections in the thermoelectric circuit be of the low resistance type, that the conductors in said circuit be of low resistance material, and that said conductors be of limited length. This necessitates placement of the thermoelectric generator, the valve, and the other elements of the thermoelectric circuit relatively close to one another. It also limits the number and character of control instrumentalities that can be included in such a circuit.

There are certain installations, however, where it is desirable to have the valve or other thermoelectrically powered device responsive to a control device which cannot be successfully incorporated in the thermoelectric circuit. For example, where a thermoelectrically powered fuel control valve is used in a furnace or space heater installation, it may be desirable to make said valve responsive to changes in temperature sensed by a thermostat located remote from the heating unit. Heretofore such an arrangement has been impossible because extension of the thermoelectric circuit conductors to a remotely located thermostat introduced so much resistance in the circuit that thermoelectric current could not flow therethrough in sufficient quantity to energize the valve operator. As another example, clock control of such a circuit has been impossible since the contacts of known controls of this character would necessarily introduce an undesirably high resistance into the circuit.

With this in mind, it is a general object of the present invention to provide an improved apparatus by which the flow of current in a thermoelectric circuit can be controlled externally of the thermoelectric circuit and responsive to a control device the location of which may be remote from said thermoelectric circuit.

Another object of the invention is to provide means for affording remote control of certain existing thermoelectric circuits without breaking into said circuits and without affecting the resistance characteristics of said circuits.

More specifically an object of the invention is to provide an improved apparatus of the character described which includes a pair of coacting contacts in the thermoelectric circuit and encapsulated within a hermetically sealed enclosure, there being an actuator connected to a higher voltage source and positioned to actuate one of said contacts when said actuator is energized, there being a circuit controlling device, for example a thermostat, in said higher voltage circuit for controlling the current flow to said actuator, and thereby externally controlling the flow of current in said thermoelectric circuit, the higher voltage in said actuator circuit permitting said thermostat to be located remote from the thermoelectric circuit to provide control of said circuit from said remote location, where desired.

Another object of the invention is to provide an improved apparatus of the character described whereby external control of a thermoelectric circuit utilizing a condition responsive encapsulated contact circuit controlling device, is provided by supplying to said device an external higher voltage actuator responsive to another control instrumentality in circuit with said actuator, said thermoelectric circuit being readily placed under the local control of the encapsulated contact condition responsive circuit controlling device on failure of the higher voltage power to permit continued operation during such power failure.

Another object of the invention is to provide an improved apparatus of the character described wherein the flow of current in the thermoelectric circuit is normally under the control of the circuit controlling device in the external actuator circuit, and can in addition be under the control of the condition responsive encapsulated contact circuit controlling device. For example, the encapsulated contact circuit controlling device may provide a low temperature limit function preventing temperatures below a predetermined minimum when the external actuator circuit is inoperative or is shut off, for example during night turn-down of a heating plant.

Another object of the invention is to provide an improved apparatus of the character described in which the higher voltage circuit controlling device may take the form of a clock-controlled switch, for example to provide for the flow of fuel through a thermoelectrically powered valve to an oven burner at a predetermined time and for a predetermined period for which the switch-controlling clock is set.

Another object of the invention is to provide an improved apparatus of the character described which permits the use of means responsive to an extreme in the condition to be controlled, for example, a high limit temperature switch or the like, in either the thermoelectric circuit or in the higher voltage circuit.

A further object of the invention is to provide an improved apparatus of the character described which is simple in construction, efficient in operation, and otherwise well adapted for the purposes described.

Other and further objects and advantages of the invention will appear from the following detailed description, taken in connection with the accompanying drawings, in which.

Figure 3:
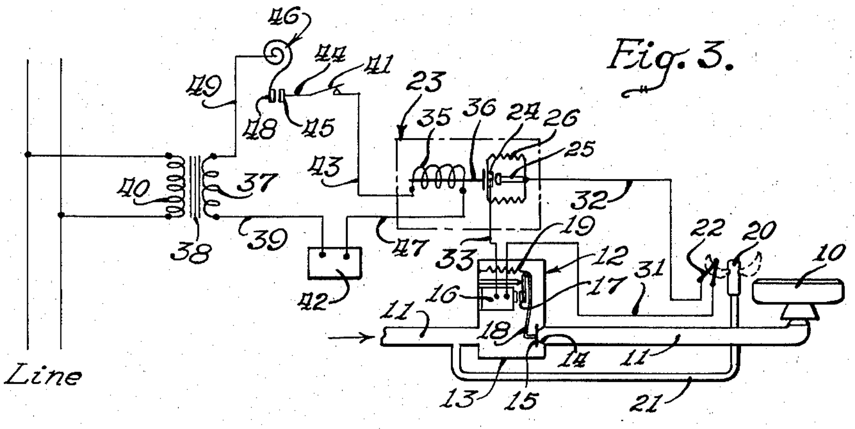
Figure 3 is a schematic wiring diagram of one form of the improved apparatus utilizing thermostatic control of the actuator circuit.

Referring more particularly to Figure 3 of the drawings, the numeral 10 indicates a main burner of a fluid fuel burning unit, for example a space heater (not shown). A main fuel supply line 11 is connected to the burner 10, and interposed in the line 11 is a cycling type thermoelectrically powered valve 12. The valve 12 may be of the general type shown and described in the copending application for patent of Gerald E. Dietz and Adolph J. Hilgert, Serial No. 292,488, filed June 9, 1952, now Patent No. 2,822,984. The structure of the valve 12 will not be described in detail herein, reference being had to the aforementioned application for this purpose.

Suffice it to state for the purpose of this specification, that the valve 12 has a body or casing 13 provided with an inlet and an outlet to which contiguous sections of the line 11 are connected. An annular valve seat 14 surrounds the outlet opening, and a valve disk 15 coacts with the seat 14 to control the flow of fuel to the burner 10. The operator from the valve 14 includes an electromagnet 16 having a pair of terminals, and an armature 17 coacts with said electromagnet. The valve disk 15 is carried by a pivotally mounted arm 18 which may have a resilient connection with the armature 17, said arm being biased in a valve closing direction by a tension spring 19. When the electromagnet 16 is energized, the valve 15 is moved to open position, and when the electromagnet is deenergized, the valve 15 is moved to closed position.

A pilot burner 20 is mounted adjacent the main burner 10 and is supplied with fuel by a line 21 which connects with any suitable source, for example the line 11 upstream from the valve 12. Where it is desired to provide 100 percent shut-off, a thermoelectrically powered safety shut-off valve (not shown) may be used, said valve being powered by the thermocouple 22 or by a separate thermocouple subject to the heat of the pilot burner flame. Such a safety shut-off valve may take the general form of the pilot line safety shut-off valve shown and described in the copending application for patent of Gerald E. Dietz and Adolph J. Hilgert, Serial No. 292,488, filed on June 9, 1952.

A thermoelectric generator 22, which may take the form of a thermocouple, is mounted adjacent the pilot burner in a position wherein its "hot" junction is subject to the heat of the flame of said burner. An improved control device 23, the structure and operation of which will be described in detail hereinafter, has a pair of normally open contacts 24 and 25 which are encapsulated within a hermetically sealed expansible and contractible enclosure 26, for example a bellows.

One terminal of the thermocouple 22 is connected in circuit with one terminal of the electromagnet 16, as by a conductor 31, and the other terminal of the thermocouple is connected in circuit with the contact 25 of the control device 23, as by a conductor 32. The other terminal of the electromagnet 16 is connected in circuit with the contact 24 of the control device 23, as by a conductor 33. Engagement of the contacts 24 and 25 causes energization of the electromagnet 16 by thermoelectric current generated by the thermocouple 22, said energization causing movement of the valve 15 to open position, thus permitting fuel to flow to the main burner 10. Disengagement of the contacts 24 and 25, or failure of the pilot burner 20, causes deenergization of the electromagnet 16 and closure of the valve 15.

The control device 23 includes an electro-responsive actuator which may take the form of a solenoid coil 35 and a coacting solenoid plunger 36 positioned to cause engagement of the contacts 24 and 25 when the coil 35 is energized. One terminal of the solenoid coil 35 may be connected through a conductor 47 to a high temperature limit switch 42 having normally closed contacts (not shown), and a conductor 39 connects said switch to one side of a higher voltage source, for example one side of the secondary 37 of a plug-in type step down transformer 38. The primary 40 of the transformer 38 may be connected in circuit with a 110 volt line, and the relative size of the coils 40 and 37 may be such that approximately 24 volts is available at the terminals of secondary 37.

The other terminal of the solenoid coil 35 may be connected, as by a conductor 43, with one contact of a normally closed switch 41 which may be a night turndown switch in certain installations and which may be clock controlled if desired. The other contact of the switch 41 may be connected by a conductor 44 to a contact 45 of a temperature control thermostat 46. The other contact 48 of the thermostat 46 is connected in circuit with the other terminal of the transformer secondary 37, as by a conductor 49. The contacts 45 and 48 of the temperature control thermostat 46 are opened and closed in response to normal fluctuations in ambient temperature. Because of the higher voltage in the solenoid circuit, the thermostat 46 may be located remote from the control device 23, for example in another room or on a remote wall of the same room. The distance between the thermostat 46 and the control device 23 is not critical, since the variations in conductor resistance caused by increased conductor length does not substantially affect the response of the solenoid to the cycling of said thermostat because of the higher voltage available.

Figure 1:
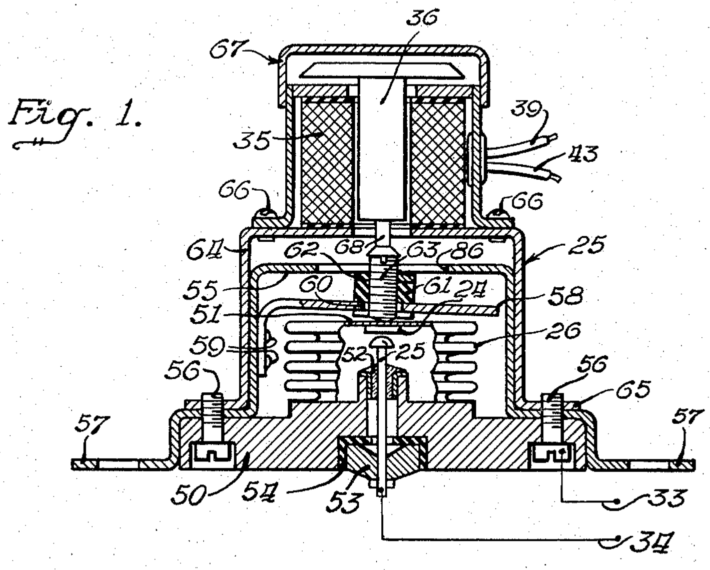
Figure 1 is an axial sectional view of an improved normally open contact control device constructed in accordance with the invention and adapted for use in the improved apparatus.

Referring to Figure 1, the structure of the control device 23 will now be described in detail. A centrally apertured base plate 50 forms a stationary end wall for the bellows 26 which also has a movable opposite end wall 51, to the inner surface of which the contact 24 is fixed. The contact 25 has a rounded inner end portion and projects within the central aperture of the plate 50, being insulated therefrom by a glass seal 52. The contact 25 is electrically connected to a terminal tip 53 which is insulated from the plate 50 by an insulator 54. As previously mentioned, the bellows 26 is hermetically sealed. The space within the bellows 26 may be filled with a thermally expansible and contractible volatile fluid fill which will not react with or cause film formation on the contacts 24 and 25. In certain installations, however, it may be desirable to use a fill which is not substantially temperature responsive, for example dry air.

A bracket 55 of generally U-shaped configuration diametrically straddles the bellows 26 and is secured to the plate 50, as by screws 56, said bracket having apertured end portions 57 projecting laterally from the plate 50 to provide mounting means for the control device 23. The bracket 55 is provided with a central aperture 86, and fixed to said bracket at one side of the bellows 26, as by rivets 59, is one end of a leaf spring 58. The leaf 58 is apertured as at 60, and carries an adjustment screw 63 and mounting means therefor. The adjustment screw mounting means comprises a friction washer 61 of plastic or other suitable material fixed to the leaf 58 over the aperture 60 by a C-shaped clip 62 which extends over and around said washer and is turned under opposite side edges of said leaf as shown. The adjustment screw 63 is threaded through the clip 62, and with a self-tapping action is also threaded through the washer 61, said screw engaging the bellows end wall 51 opposite the contact 24. The adjustment of the screw 63 determines and maintains the normal spacing or the contact pressure between the contacts 24 and 25 at a predetermined setting and compensates for any variations in length of the bellows 26 tending to vary the contact spacing or the contact pressure from said predetermined setting. The leaf spring 58, through the screw 63, biases the contact 24 toward the contact 25, and this bias is resisted by the inherent spring force of the bellows 26 tending to separate said contacts. The resultant equilibrium of forces spaces the contact 24 from the contact 25 as shown or at least reduces the contact pressure therebetween sufficiently to prevent the flow of thermoelectric current therethrough.

A centrally apertured cup-shaped cover 64 encloses the bellows assembly as shown, and has a peripheral flange 65 by which it is fixed to the screws 56 and hence to the plate 50. Mounted on the cover 64, as by screws 66, is a solenoid casing 67 within which the coil 35 and plunger 36 are positioned. The plunger 36 is provided with a stem portion 68 which projects through the central aperture of the cover 64 and engages the screw 63 as shown. Adjustment of the position of the screw 63 to set the contact spacing also positions the head of said screw for proper engagement by the plunger stem 68. As previously mentioned, energization of the coil 35 causes movement of the plunger 36 toward the bellows 26, which in turn moves the contact 24 into engagement with the contact 25 or reduces the contact pressure between said contacts sufficiently to complete the thermoelectric circuit and cause energization of the electromagnet 16. It is apparent, therefore, that cycling of the thermostat 46 causes corresponding cycling of the main burner fuel control valve 12. It is also apparent that the main burner fuel control valve 12 closes on pilot failure, due to the attendant failure of the energization thermoelectric current. This provides safety shut-off of the main burner fuel. Because of the cycling nature of the valve 12, the latter does not require resetting upon reignition of the pilot burner.

Figure 2:
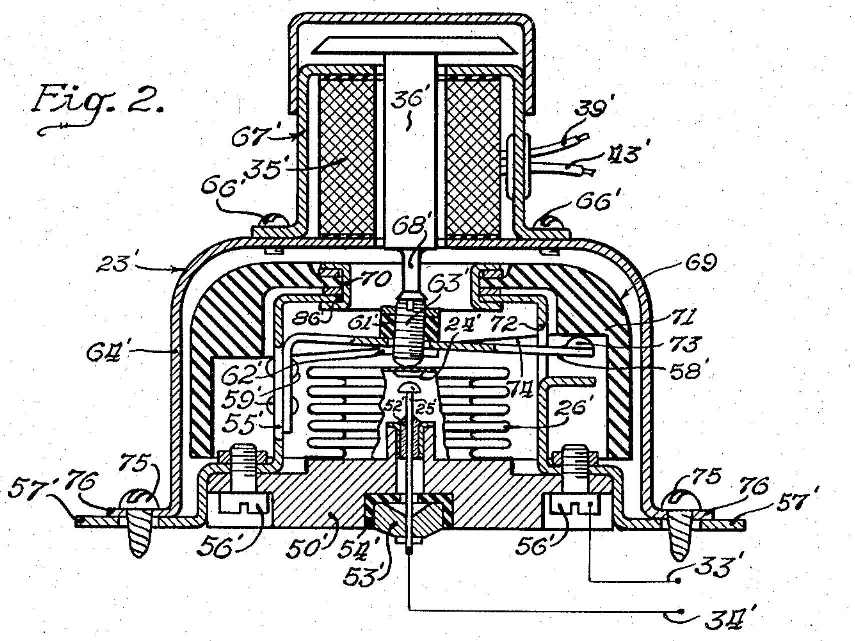
Figure 2 is an axial sectional view of another form of improved control device adapted for use in the improved apparatus, said control device comprising an encapsulated contact thermostat to which a solenoid actuator has been applied.

Figure 2 illustrates a control device 23' which may be produced by associating a solenoid actuator with an encapsulated contact thermostat to provide for external control of an existing thermoelectrically powered fuel control circuit which may also include a thermoelectric generator, such as the thermocouple 22 and a fuel control valve such as the valve 15. The thermostat is indicated by the numeral 69 and is in general similar to the structure shown and described in the copending application of Adolph J. Hilgert, case 4, Serial No. 291,047, filed May 31, 1952, now Patent No. 2,724,030. The thermostat 69 has a number of parts which are similar to corresponding parts of the control device 23 (Figure 1), the parts indicated by primed numerals in Figure 2 corresponding to the parts of Figure 1 which are indicated by the same numerals unprimed. A detailed description of the thermostat 69 will not be necessary, except for the structure thereof which differs from that of the control device 23.

In the thermostat 69 the aperture 86' of the bracket 55' receives a sleeve bearing 70 on which a temperature control knob or dial 71 is rotatably mounted. The leaf spring 58' projects through a suitable aperture 72 in the bracket 55' and has an end portion 73 which engages an angled cam surface 74 formed on the knob 71. The bellows 26' contains a thermally expansible and contractible volatile fluid fill which is normally operable to move the contact 24 into and out of engagement with the contact 25 or to vary the contact pressure, and hence the resistance, between said contacts sufficiently to permit or prevent the flow of thermoelectric current therethrough in response to fluctuations in ambient temperature. When the thermostat 69 is utilized to form the control device 23', the knob 71 may be turned to a point where during normal temperature fluctuations to which the thermostat 46 is responsive the fill alone is unable to cause the contact 24' to engage the contact 25' sufficiently to complete the thermoelectric circuit. The setting may be such, however, that the contacts engaged sufficiently to complete the circuit by response of the fill to a predetermined lower temperature, for example the low limit temperature desired during night turn-down of a heating plant.

In the form of the invention shown in Figure 2 the cover 64' permits access to the knob 69 and carries the solenoid casing 67' within which the solenoid coil 35' and plunger 36' are enclosed. The stem 68' of the plunger 36' projects within the bearing sleeve 70 into engagement with the adjustment screw 63' of the thermostat 69. The cover and solenoid assembly is held in assembled relationship with respect to the thermostat 69 by means of the mounting screws 75 for the thermostat, which screws project through apertured ears 76 on the cover 64' as well as through the apertured ears 57' of the thermostat 69. It is apparent, therefore, that associating the cover 64' and its solenoid assembly with the thermostat 69 produces a control device 23' similar to the control device 23 of Figure 1, but having the additional temperature control adjustment provided by the knob 69 and its coaction with the leaf 58'. The electrical circuit for the control device 23' may be identical with that shown in Figure 3.

Where the control device 23' is utilized in the control of fuel flow to a heating plant, the knob 69 may be turned down so that the fill in the bellows 26' effects circuit-completing engagement of the contacts 24' and 25' only at a predetermined low limit temperature. Thus, where the switch 42 is opened to render the external actuator circuit inoperative, for example on night turn-down, the thermostat 69 responds to a drop in temperature to said predetermined low limit and engages the contacts 24' and 25' or increases the contact pressure therebetween sufficiently to open the valve 12 and cause fuel flow to the burner 10. Obviously, the thermostat 69 would similarly respond to the low limit temperature if the switch 42 were closed and for some reason or other the actuator circuit was inoperative to engage the contacts 24' and 25'.

Another feature provided by the control device 23' is that upon failure of the power supply to the actuator circuit, the knob 69 can be turned up to the desired temperature setting to provide local thermostatic control of the thermoelectric circuit by the thermostat 69.

In certain instances it may be desirable to have the thermostat set at a higher setting so that it can cycle in response to temperature changes. In the latter instance the actuator could respond to cycling of the thermostat 46 to overcall the thermostat 69 and close the contacts thereof, holding the latter closed as long as the actuator is energized, regardless of the position to which the thermostat 69 tends to urge said contacts.

While the high limit temperature switch 41 has been illustrated in the solenoid circuit, it is obvious that an encapsulated contact type high limit switch (not shown) suitable for use in the thermoelectric circuits may be alternatively utilized in the thermoelectric circuit, if desired, to provide a high limit temperature safety feature.

Figures 4, 5:
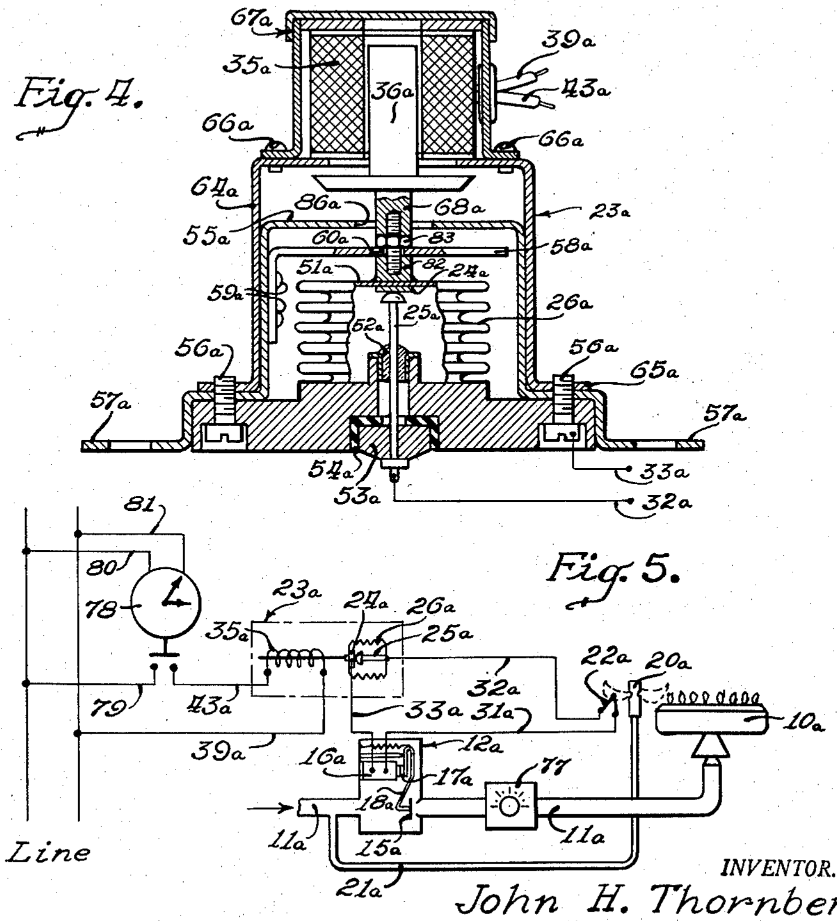
Figure 4 is an axial sectional view of a normally closed contact control device constructed in accordance with the invention.
Figure 5 is a schematic wiring diagram of another form of the invention utilizing clock control of the actuator circuit.

Figure 5 shows another form of the invention adapted for use in kitchen ranges or anywhere that it is desired to provide external clock control of a thermoelectrically powered fuel control circuit. The form of the invention shown in Figures 4 and 5 has a number of components which are analogous to corresponding parts of the form of the invention shown in Figures 1 and 3. Parts indicated by numerals bearing the suffix "*a*" in Figures 4 and 5 correspond to similar parts in Figures 1 and 3 indicated by the same numerals without a suffix. The specific structural details of the parts of the form of the invention shown in Figures 4 and 5 will not be described in detail except as they differ from the parts of the form of the invention shown in Figures 1 and 3.

Referring to Figure 5, a main burner **10*a*, for example an oven burner, is supplied with fuel through a supply pipe 11*a* in which is interposed a thermoelectrically powered fuel control valve 12*a*. A thermostatically controlled fuel valve 77 of any well known type may also be interposed in the pipe 11*a* as shown. A pilot burner 20*a* is mounted adjacent the burner 10*a* and is supplied with fuel through a pipe 21*a*, there being a thermoelectric generator 22*a***, which may take the form of a thermocouple mounted in a position to be subject to the heat of the pilot burner flame.

The electromagnet coil **16*a* of the valve 12*a* is connected in series with the thermocouple 22*a* and with the encapsulated contacts 24*a* and 25*a* of the control device 23*a* by means of the conductors 31*a*, 32*a*, and 33*a* as shown. The solenoid coil 35*a*** may be connected in circuit with one side of a line, such as a 110 volt line, through a conductor 39a, said coil also being connected to one contact of a normally open clock-controlled switch 78 through a conductor 43a. The other contact of the switch 78 may be connected in circuit with the other side of the line through a conductor 79. The timing mechanism of the switch 78 may be connected across the line through conductors 80 and 81 as shown.

Referring now to Figure 4, it will be noted that the bellows end wall 51a is provided with a stem or projection 82 fixed axially thereto. A stud 83 having both ends threaded and having a central head portion has one end projecting through the opening 60a in leaf spring 58a and threaded axially into the stem 82. The spring force of the leaf 58a tends to urge the contact 24a into engagement with the contact 25a. The other end of the stud 83 is threaded axially into the solenoid plunger stem 68a, so that the solenoid plunger 36a and the bellows wall 51a are fixed together. Any other suitable means may be used for fixing the plunger 36a to the bellows wall 51a, if desired. The solenoid plunger 36a and coil 35a are so arranged that when the coil 35a is energized, the plunger 36a pulls the contact 24a away from the contact 25a or at least reduces the contact pressure, and hence increases the contact resistance, therebetween sufficiently to interrupt the flow of thermoelectric current therethrough.

In operation of the form of the invention shown in Figures 4 and 5, the clock-controlled switch 78 has its contacts open during the period in which it is desired to have the oven burner 10a functioning. The thermostatic valve 77 is set to the oven temperature desired, and setting the clock for oven operation at a predetermined future period closes the contacts of the switch 78 and energizes the solenoid coil 35a. This opens the contacts 24a and 25a and causes closure of the valve 12a. At the predetermined time for which the clock is set, the contacts of the switch 78 open to deenergize the solenoid coil 35a and permit the spring 58a to close the contact 24a against the contact 25a. This permits thermoelectric current to flow from the thermocouple 22a to the coil 16a, and the valve 12a opens, permitting fuel to flow to the burner 10a under the control of the thermostatic valve 77.

If at any time the pilot flame should become extinguished, the coil 16a is deenergized and the valve 12a closed, to provide safety shut-off of the main burner fuel. The valve 12a requires no resetting, and upon reignition of the pilot burner said valve will again reopen if the contacts 24a and 25a are engaged sufficiently to permit flow of sufficient thermoelectric current therethrough for energization of said valve. As in the form of the invention shown in Figure 3, it is obvious that a thermoelectrically powered pilot line safety shut-off valve (not shown) may be interposed in the line 21a if 100 percent shut-off of the fuel is desired.

At the end of the predetermined interval for which the clock switch 78 is set, the contacts of said switch close and cause the solenoid coil 35a to be reenergized by the line current. This causes the plunger 36a to pull the contact 24a away from the contact 25a, or to reduce the contact pressure and hence increase the contact resistance therebetween sufficiently to interrupt the flow of thermoelectric current to the coil 16a, thereby closing the valve 12a, shutting off all fuel flow to the oven burner 10a. It will be noted that in the event of a line power failure, the oven burner can still function under the control of the valve 77 without any impairment of the safety shut-off feature. Since the solenoid coil 35a is line powered, the clock switch 78 can, if desired, be located remote from the control device 23a, valve 12a and thermocouple 22a.

If desired, the bellows 26a may contain a temperature responsive expansible and contractible volatile fluid fill, so that the control device 23a is responsive not only to actuation by the external actuator circuit, but is also responsive to predetermined temperature conditions. For example, upon failure of the valve 77 to shut off the fuel to the burner at the desired temperature, the fill in the bellows 26a expands to break the thermoelectric circuit at the contacts 24a and 25a and thereby close the valve 12a when the oven temperature reaches a predetermined high limit. It is obviously within the concept of the invention to incorporate the control device 23a in the circuit of Figure 3 in place of the control device 23 to provide high limit protection as well as external control of the thermoelectric circuit.

As in the form of the invention shown in Figure 3, there may be instances where it is desirable to have the contacts 24a and 25a cycle in response to a given temperature range, subject to overcall by the actuator, under the control of the control device in said actuator circuit. The actuator, when energized, opens the contacts 24a and 25a or reduces the contact pressure therebetween sufficiently to interrupt the flow of thermoelectric current regardless of the position toward which the contact 24a is urged by the temperature responsive fill.

Where thermostatic response of the control device 23a by itself is not desired, the bellows 26a may contain a fill, such as dry air, which is not substantially temperature responsive. While the clock switch 78, manual switch 41, and thermostatic switch 46 have been shown in the actuator circuit, it is obvious that other types of switches may be used depending upon requirements. For example the actuator circuit may be under the control of a float type boiler feed water switch.

The forms of the invention selected for illustration are for the purposes of disclosure only, and are not intended to define the limits or scope of the invention. Various changes and modifications may be made without departing from the spirit of the invention, and all of such changes are contemplated as may come within the scope of the claims.

What is claimed as the invention is:

1. In apparatus including a circuit powered from a thermoelectrically generated source, a condition responsive circuit controlling device having a pair of enclosed relatively movable coacting contacts in said thermoelectric circuit, said contacts normally controlling current flow in said thermoelectric circuit in response to variations in a given condition, an electrically powered actuator positioned to effect relative movement of said contacts to a predetermined controlling position irrespective of the response of said condition responsive device to the ambient condition for control of said thermoelectric circuit, a source of electric energy for connection with said actuator, and a control device in circuit with said actuator and source of energy therefor operable to effect connection therebetween and energization of said actuator to render current flow in said thermoelectric circuit non-responsive to variations in said condition and under control of said actuator rather than said condition responsive device.

2. In apparatus including a circuit powered from a thermoelectrically generated source, a first condition responsive circuit controlling device having a pair of enclosed relatively movable coacting contacts in said thermoelectric circuit, said contacts normally controlling current flow in said thermoelectric circuit in response to variations in a given condition, an electrically powered actuator positioned to effect relative movement of said contacts to a predetermined position irrespective of the response of said first condition responsive device to variations in said given condition for control of said thermoelectric circuit, a source of electric energy for connection with said actuator, and a second condition responsive circuit controlling device having coacting contacts in circuit with said actuator and source of energy therefor responsive to variations in a given condition other than those aforementioned to effect connection between said actuator and source of energy therefor and energization of the actuator to render current flow in said thermoelectric circuit under control of said actuator and non-responsive to the first named conditions that normally control said first condition responsive device.

3. In apparatus including a circuit powered from a thermoelectrically generated source, a condition responsive circuit controlling device having a pair of normally closed contacts in said thermoelectric circuit movable to open circuit position upon occurrence of a predetermined condition, an electrically powdered actuator positioned for actuation of said contacts to their open circuit position for preventing current flow in said thermoelectric circuit independent of variations in said given conditions, a source of electric energy for connection with said actuator, and a control device in circuit with said actuator and said source of energy therefor operable to effect connection therebetween and energization of said actuator to render current flow in said thermoelectric circuit non-responsive to variations in said condition and under control of said actuator rather than said condition responsive device.

4. Apparatus affording remote control of existing control apparatus comprising a thermoelectric circuit including a fuel control valve, a thermoelectric generator and a condition responsive device having coacting relatively movable contacts, which generator, valve and contacts are in relatively close proximity to each other in order to maintain the resistance of the thermoelectric circuit below a predetermined value, such apparatus comprising, an electrically powered actuator, mounting means associated with said actuator to assemble the latter to said existing apparatus in position to effect controlling movement of said contacts for control of thermoelectric current flow to said valve, a source of electric energy of higher voltage than that afforded by said thermoelectric generator, and condition responsive means located remotely from said generator, valve and contacts and in circuit with said actuator and source of energy for effecting energization of said actuator and thereby controlling movement of said contacts upon occurrence of a predetermined condition at said remote location, whereby the thermoelectric current flow to said fuel control valve may be controlled by said remotely located condition responsive means.

References Cited in the file of this patent

UNITED STATES PATENTS

| | | |
|---|---|---|
| 1,876,636 | Dicke | Sept. 13, 1932 |
| 2,025,097 | Dougherty | Dec. 24, 1935 |
| 2,027,064 | Rozumek | Jan. 7, 1936 |
| 2,274,938 | Ray | Mar. 3, 1942 |
| 2,285,716 | Hulsberg | June 9, 1942 |
| 2,323,702 | Berkey | July 6, 1943 |
| 2,339,276 | Larson | Jan. 18, 1944 |
| 2,349,443 | McCarty | May 23, 1944 |
| 2,372,564 | Engholdt | Mar. 27, 1945 |
| 2,510,481 | Sagar | June 6, 1950 |
| 2,560,829 | Stewart | July 17, 1951 |
| 2,717,123 | Hilgert et al. | Sept. 6, 1955 |

FOREIGN PATENTS

| | | |
|---|---|---|
| 351,809 | Germany | Apr. 13, 1922 |